United States Patent [19]

Kodama et al.

[11] Patent Number: 4,656,540
[45] Date of Patent: Apr. 7, 1987

[54] MAGNETIC TAPE LOADING AND FEEDING APPARATUS

[75] Inventors: Yoshimi Kodama; Toyozo Urakami, both of Kobe; Osamu Takao, Higashiosaka, all of Japan

[73] Assignee: Sanyo Electric Co., Ltd., Osaka, Japan

[21] Appl. No.: 724,227

[22] Filed: Apr. 17, 1985

[51] Int. Cl.$^4$ ............................................ G11B 15/66
[52] U.S. Cl. .................................................. 360/85
[58] Field of Search ................................ 360/85, 95

[56] References Cited

U.S. PATENT DOCUMENTS

| | | | |
|---|---|---|---|
| 4,481,551 | 11/1984 | Maeda | 360/85 |
| 4,563,717 | 1/1986 | Fleck et al. | 360/85 |
| 4,566,047 | 1/1986 | Hirose et al. | 360/85 |
| 4,578,725 | 3/1986 | Muller | 360/85 |
| 4,583,136 | 4/1986 | Tsuchida et al. | 360/85 |

Primary Examiner—Robert S. Tupper
Attorney, Agent, or Firm—Armstrong, Nikaido, Marmelstein & Kubovcik

[57] ABSTRACT

A tape loading mechanism for helically winding a tape around a guide cylinder by drawing the tape out of a tape cassette, including a tape take-off pin functioning also as a pin for detecting tension of the tape, a tape loading device for winding the tape around the guide cylinder over a predetermined winding angle, a cam driven in response to displacement of the tape loading device and formed with a cam groove, a shaft and a back tension lever pivotal about the shaft and provided with the tape take-off pin. The back tension lever is operatively associated with the cam groove so as to be controlled in its pivotal movement.

15 Claims, 11 Drawing Figures

MAGNETIC TAPE LOADING AND FEEDING APPARATUS

BACKGROUND OF THE INVENTION

The present invention generally relates to video tape recorders (referred to as "VTRs", hereinbelow) and more particularly, to a tape loading mechanism suitable for use in a compact VTR such as an 8-mm VRT or the like.

A recent trend for compactness of the VTRs has brough about development of the 8-mm VTR standardized as a new VTR. A tape loading mechanism of a so-called inverse U-shaped loading method is advantageously employed in the 8-mm VTR so as to make the 8-mm VTR more compact and is known from, for example, U.S. Pat. No. 4,445,154 which generally includes a first loading means for drawing, in a direction oblique with respect to a cassette mounting face of a tape cassette, a video tape out of the tape cassette and loading the video tape onto a guide cylinder obliquely with respect to the cassette mounting face, a second loading means for drawing, in parallel with the cassette mounting face, the video tape out of the tape cassette and a tape driving means displaced together with the second loading means. This known tape loading mechanism includes four tape guide pins and is disadvantageous in that it is necessary to make a change between distances between adjacent ones of the four guide pins at the time of unloading of the video tape and those at the time of loading of the video tape, thereby making this known tape loading mechanism complicated in structure.

Furthermore, another tape loading mechanism of the above described type has been proposed in, for example, U.S. Pat. No. 4,491,886. In this prior art tape loading mechanism, the first loading means includes four tape guides, i.e., a pair of leading tape guides and a pair of trailing tape guides. At the time of unloading of the video tape, the leading tape guides are disposed in a recess of the tape cassette but the trailing tape guides are disposed outwardly of the recess of the tape cassette, i.e., outwardly of a tape loop. Thus, it is possible to secure the leading tape guides to respective movable bases. However, in the case where the trailing tape guides are secured to respective movable bases, it becomes impossible to advance the trailing tape guides into the tape loop due to operational restrictions associated with the inverse U-shaped loading method. Therefore, in the prior art tape loading mechanism, it is so arranged that erectable trailing tape guides are employed, namely, the erectable trailing tape guides are preliminarily laid down immediately after start of loading of the video tape and then, are erected after having been displaced into the tape loop, thereby making constructions of the prior art tape loading mechanism extremely complicated.

SUMMARY OF THE INVENTION

Accordingly, an essential object of the present invention is to provide an improved tape loading mechanism which is simple in construction through elimination of the need for provision of erectable tape guides of prior art tape loading mechanisms of an inverse U-shaped loading method.

Another important object of the present invention is to provide an improved tape loading mechanism of the above described type which functions so highly accurately as to be satisfactorily applicable to an 8-mm VTR.

In order to accomplish these objects of the present invention, a tape loading mechanism embodying the present invention for helically winding a tape around a guide cylinder by drawing said tape out of a tape cassette comprises: a tape take-off pin for taking off said tape from said tape cassette, which functions also as a pin for detecting tension of said tape; a tape loading means which winds said tape around said guide cylinder over a predetermined winding angle; said tape take-off pin and said tape loading means being inserted into a recess of said tape cassette at the time of unloading of said tape; a cam which is driven in response to displacement of said tape loading means and is formed with a cam groove; a shaft; and a back tension lever which is pivotally provided so as to be pivoted about said shaft and is provided with said tape take-off pin; said back tension lever being operatively associated with said cam groove so as to be controlled in its pivotal movement such that said tape take-off pin takes off said tape from said tape cassette in response to the displacement of said tape loading means; said cam groove being formed, at a position thereof corresponding to a tape loading completion position of said tape take-off pin, larger in width than other portions of said cam groove so as to allow said tape take-off pin to be pivoted at said tape loading completion position such that said tape take-off pin is capable of detecting the tension of said tape; said back tension lever being coupled with a brake of a supply reel base for rotating a tape supply reel of said tape cassette.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
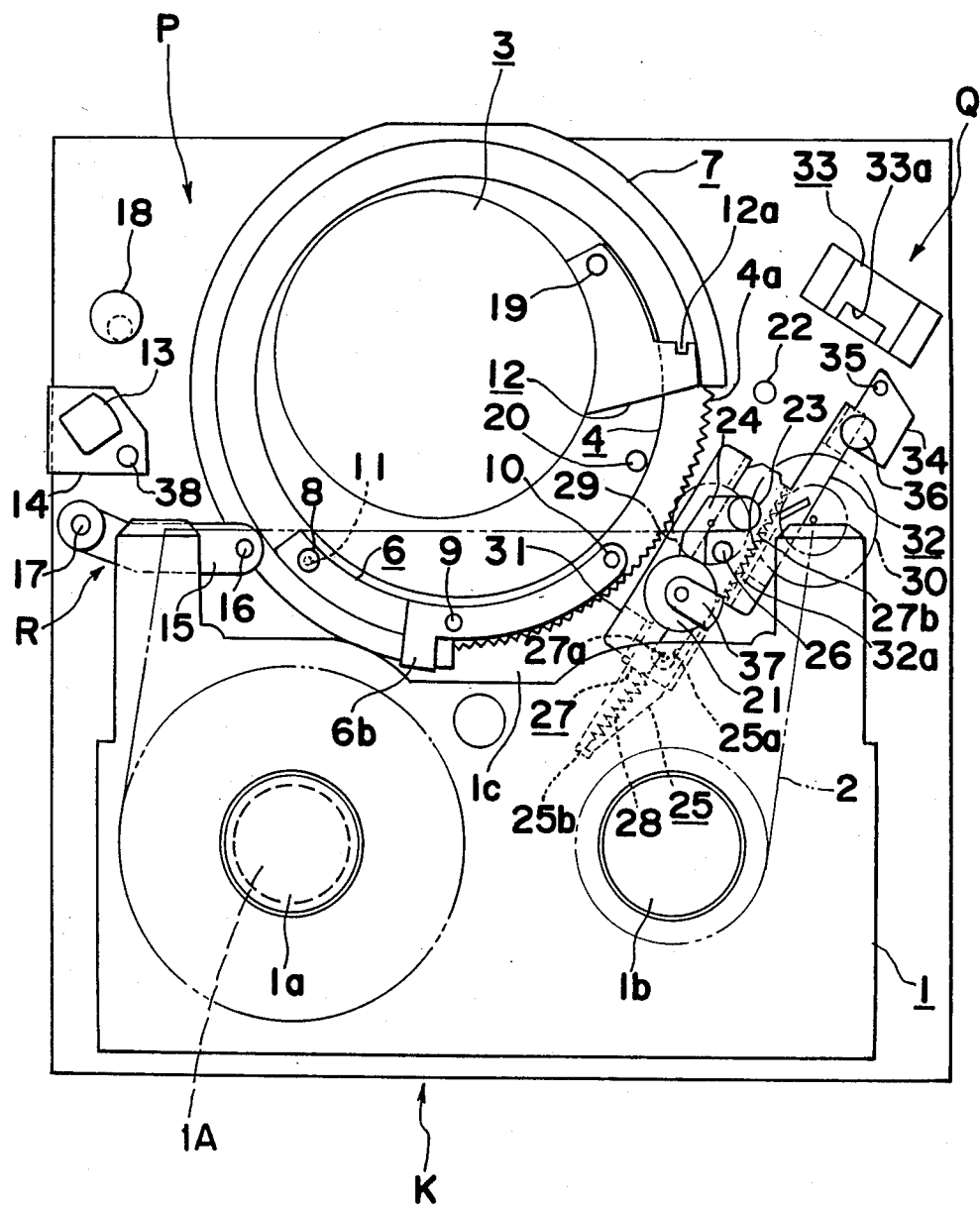
FIG. 1 is a top plan view of a tape loading mechanism according to one preferred embodiment of the present invention, showing its tape unloading state.
Figure 2:
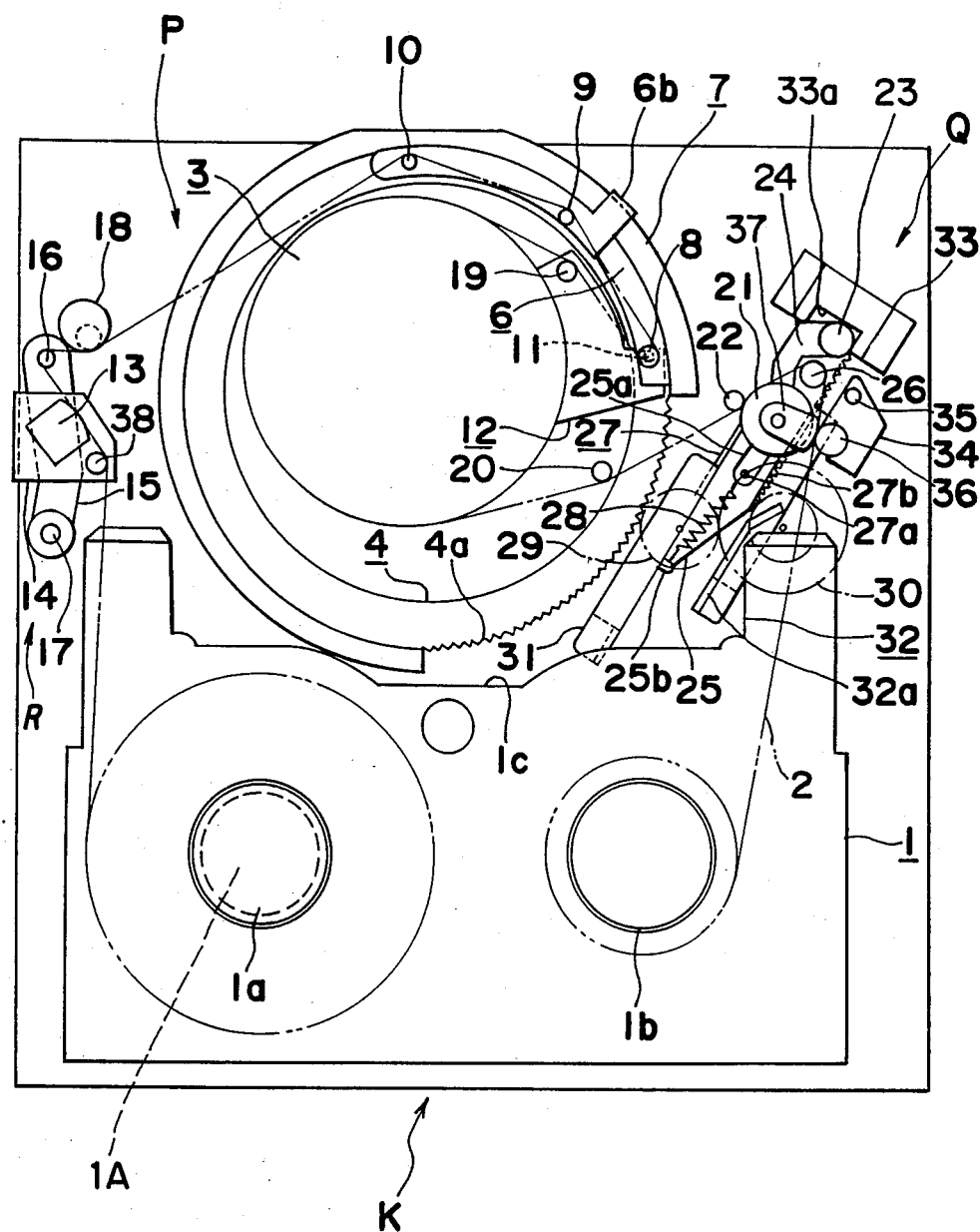
FIG. 2 is a view similar to FIG. 1, particularly showing its tape loading state.

Referring now to the drawings, there is shown in FIGS. 1 and 2, a tape loading mechanism K according to one preferred embodiment of the present invention, which is applied to an 8-mm VTR. The tape loading mechanism K employs a novel U-shaped loading method and generally includes a first loading mechanism P, a second loading mechanism Q and an ejector mechanism R for ejecting a back tension lever 15.

Initially, the first loading mechanism P will be described with reference to FIGS. 1 to 5 and FIG. 8, hereinbelow. The first loading mechanism P includes a guide cylinder 3 having a built-in rotary head (not shown), an annular loading disk 4 rotatably provided around the guide cylinder 3, and a joint 5 coupled, at one end thereof, with the loading disk 4. A tape cassette 1 is provided with a tape supply reel 1a and a tape take-up reel 1b having a video tape 2 extending therebeween and is formed, at a front face thereof, with a recess 1c. The tape cassette 1 is liftably supported by a cassette holder (not shown). The guide cylinder 3 is constituted by a rotatable upper guide cylinder 3a and a fixed lower guide cylinder 3b. The loading disk 4 is formed, at an outer periphery thereof, with a gear portion 4a. The joint 5 is rotatable in upward and downward directions in FIG. 5 and is urged by a coiled spring in such a direction as to be extended. It is to be noted that such a construction of the joint 5, per se, is already known.

Figure 4:
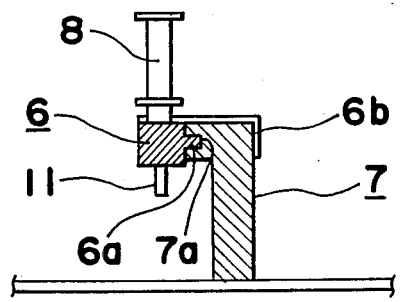
FIG. 4 is a fragmentary cross-sectional view of a bracket and a bracket guide employed in the first loading mechanism of FIG. 3.

The first loading mechanism P further includes a bracket 6 coupled with the other end of the joint 5, a bracket guide 7 for supporting the bracket 6, a leading guide pin 8 secured to an upper face of the bracket 6, a stopper pin 11 projecting downwardly, in alignment with the leading guide pin 8, from a lower face of the bracket 6, and a first fixed block 12 fitted around the lower guide cylinder 3b. The bracket guide 7 circumferentially extends over about 270° at an outer circumference of the loading disk 4. As shown in FIG. 4, a projection 6a of the bracket 6 is fitted into a guide groove 7a formed at an inner circumference of the bracket guide 7 and a bent piece 6b of bracket 6 is fitted over an upper face and an outer side face of the bracket guide 7 such that the bracket 6 is movably supported by the bracket guide 7. The first and second guide pins 9 and 10 are arranged to hold folded portions of the video tape 2 out of contact with each other. At the time of completion of loading of the video tape 2, the stopper pin 11 is brought into engagement with a slot 12a of the first fixed block 12.

Furthermore, the first loading mechanism P includes a full width erasing head 13 provided, between the tape supply reel 1a and the guide cylinder 3, in a tape travel path, a support plate 14 having the erasing head 13 secured thereto, the back tension lever 15 provided, at one end thereof, with a pin 16 for detecting tension of the video tape 2, and a rod 17. The back tension lever 15 is pivotally supported by the rod 17 and is driven by the ejector mechanism R to be described later. The pin 16 functions also as a tape take-off pin.

Figure 3:
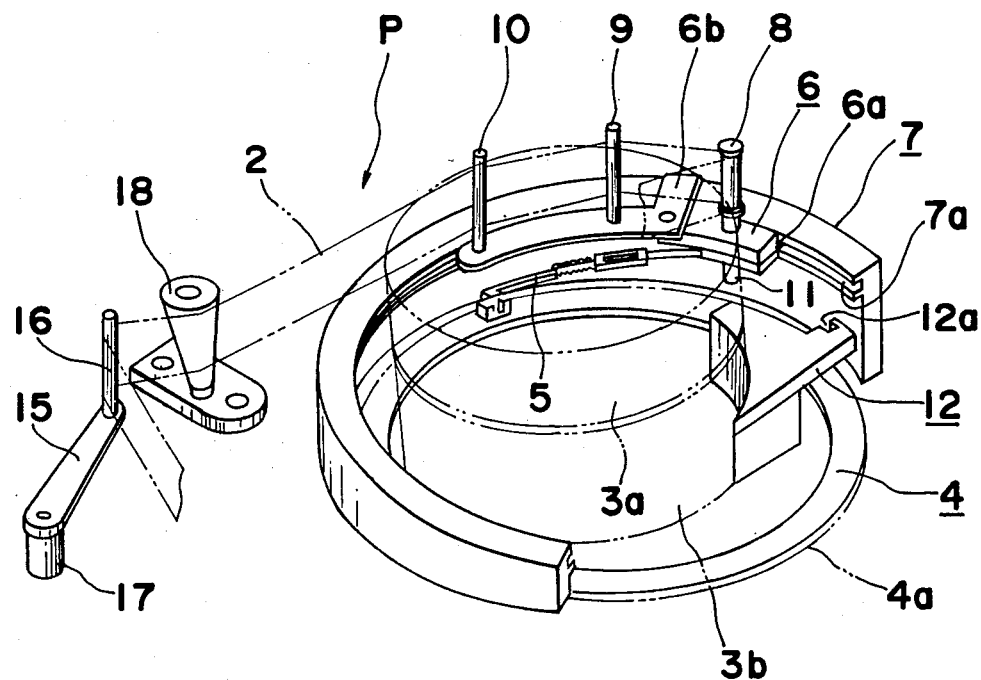
FIG. 3 is a perspective view of a first loading mechanism employed in the tape loading mechanism of FIG. 1.

Moreover, the first loading mechanism P includes a taper guide pin 18, and pins 19 and 20. As shown in FIG. 3, the taper guide pin 18 is of a substantially conical shape having its larger diameter portion oriented upwardly and is arranged to draw video tape 2 horizontally out from tape supply reel 1a and to wind tape 2 obliquely around the guide cylinder 3.

Meanwhile, as shown in FIG. 2, a winding angle of the video tape 2 wound around the guide cylinder 3 is set at about 210° by the pins 19 and 20.

Hereinbelow, the second loading mechanism Q will be described with reference to FIGS. 1, 2, 6 and 7. The second loading mechanism Q includes a pinch roller 21, a capstan 22, a lever 24 pivotally supported by a rod 23, a first slide member 25, a tape take-off pin 26 mounted on the first slide member 25, and a second slide member 27 disposed below the first slide member 25. The pinch roller 21 is held in pressing contact with the capstan 22 so as to run the video tape 2 at a constant speed and is placed on the lever 24, while the rod 23 is supported by the first slide member 25. The first slide member 25 is formed with an elongated through-hole 25a into which a pin 27a driven into the second slide member 27 is loosely inserted. A spring 28 is provided between the pin 27a and a raised portion 25b formed on one end of the first slide member 25 so as to couple the first and second slide members 25 and 27 with each other. The second slide member 27 is formed, at one side face thereof, with a gear portion 27b.

Figure 6A:
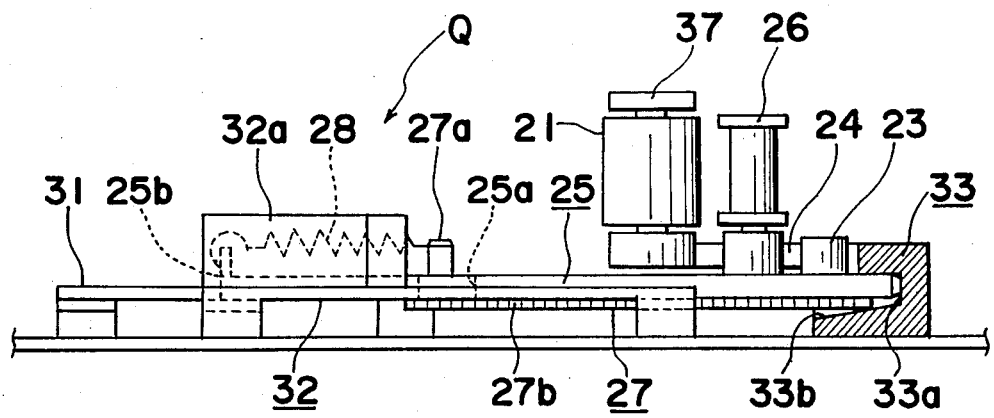
FIGS. 6a and 6b are a side elevational view and a front elevational view of a second loading mechanism employed in the tape loading mechanism of FIG. 1, respectively.
Figure 6B:
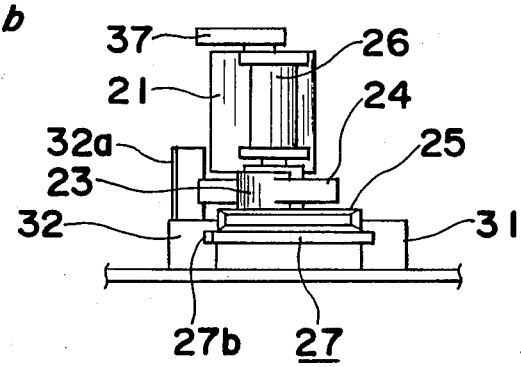

The second loading mechanism Q further includes a loading gear 29 coupled with a loading motor (not shown), a reduction gear 30 in mesh with the loading gear 29, and guide members 31 and 32. The gear portion 27b of the second slide member 27 is engaged with the reduction gear 30 in mesh with the loading gear 29. The loading gear 29 is also in mesh with the gear portion 4a of the loading disk 4 such that the loading disk 4 and the second slide member 27 are driven synchronously with each other. As shown in FIG. 6b, the second slide member 27 is slidably interposed between the U-shaped guide members 31 and 32. The guide member 32 is made of synthetic resin and is provided with an integrally molded pinch roller guide 32a for guiding an end portion of the lever 24 through its engagement therewith. It should be noted here that since the lever 24 is urged in the counterclockwise direction in FIG. 1 by a torsion spring (not shown), the guide 32a is provided in order to prevent the pinch roller 21 from coming into contact with a boundary portion of the recess 1c of the tape cassette 1 at the time of loading of the video tape 2.

Furthermore, the second loading mechanism Q includes a second fixed block 33, a lever 34 pivotally supported by a rod 35, a guide 36 provided at a pivotal end of the lever 34, and a flange 37 mounted on the pinch roller 21. At the time of completion of loading of the video tape 2, distal ends of the first and second slide members 25 and 27 are fitted into a slot 33a of the second fixed block 33 such that the first and second slide members 25 and 27 are fixed in position by the second fixed block 33. The lever 34 urges the pinch roller 21 into pressing contact with the capstan 22. Namely, in response to a "play" operation of the 8-mm VTR after completion of loading of the video tape 2, the guide 36 depresses an end portion of the lever 24 and the flange 37 so as to bring the pinch roller 21 into pressing contact with the capstan 22.

Meanwhile, the lever 34 is controlled by a solenoid (not shown). However, since a mechanism therefor is already known, description thereof is abbreviated for the sake of brevity. When the pinch roller 21 is held in an out of pressing contact with the capstan 22, the guide 34 functions also as a tape guide. Namely, the video tape 2 fed between the pinch roller 21 and the capstan 22 is guided by the tape take-off pin 26 and the guide 36 so as to be wound around the tape take-up reel 1b. Since the tape cassette 1 for the 8-mm VTR is not provided therein with a tape guide so as to be made compact in size, such a phenomenon may take place that the video tape 2 comes into contact with a side face of a tape inlet of the tape cassette 1 in the case where a winding diameter of the tape take-up reel 1b changes. Accordingly, in order to eliminate the above described phenomenon, any tape guide is required to be provided. The guide 36 functions as this tape guide. Since this problem arises also at the tape supply reel 1a, a fixed pin 38 having the same function as that of the guide 36 is driven into the support plate 14.

Then, the ejector mechanism R for ejecting the back tension lever 15 will be described with reference to FIGS. 8a and 8b, hereinbelow. The ejector mechanism R includes a first gear 39 mounted on the rod 17, a sector wheel 41 pivotally mounted on a rod 40, a brake band 42, a spring 43, a second gear 44, a third gear 45 and a fourth gear 46. The first gear 39 is in mesh with the sector wheel 41. The brake band 42 wound, at one end thereof, around a supply reel base 1A for rotating the tape supply reel 1a is attached, at the other end thereof, to the sector wheel 41. The spring 43 is connected between the sector wheel 41 and a chassis of the 8-mm VTR and urges the sector wheel 41 in the clockwise direction, i.e., the back tension lever 15 in the counterclockwise direction so as to tense the video tape 2. Furthermore, the sector wheel 41 is provided with a pin 41a engageable with a cam groove 44a of the second gear 44. A stroke end of the cam groove 44a, which corresponds to a position (FIG. 8b) of the pin 41a at the time of completion of loading of the video tape 2, is formed larger in width than other portions of the cam groove 44a so as to allow the pin 41a to move therein through a predetermined distance. The third gear 45 is in mesh with the second gear 44. Meanwhile, the fourth gear 46 is provided in alignment with the third gear 45 and is in mesh with the gear portion 4a of the loading disk 4. Thus, in response to rotation of the loading disk 4, the back tension lever 15 is ejected together with the video tape 2 from a position shown in FIG. 8a to a position shown in FIG. 8b. Meanwhile, since operations of the back tension mechanism itself in a state of completion of loading of the video tape 2 are known, description thereof is abbreviated for the sake of brevity.

Figure 5A:
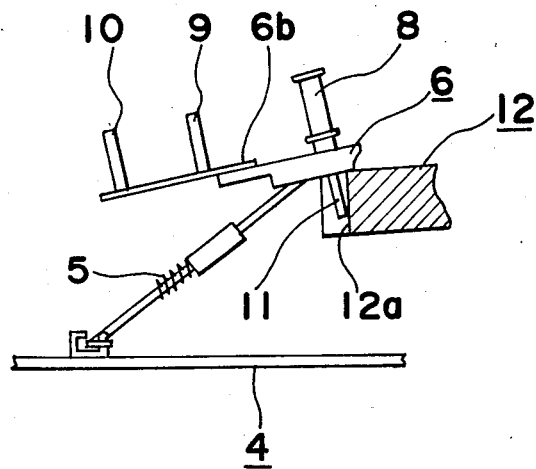
FIGS. 5a and 5b are side elevational views of the bracket of FIG. 4, showing the states before and after reaching its stroke end, respectively.
Figure 5B:
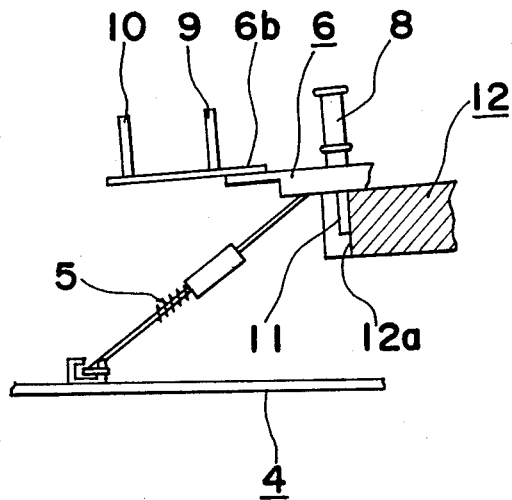

Then, operations of the first loading mechanism P, the second loading mechanism Q and the ejector mechanism R will be described, hereinbelow. Initially, as shown in FIG. 1, when the tape cassette 1 is inserted into the cassette holder (not shown) and then, is lowered to a loading position, the loading motor (not shown) is started so as to rotate the loading gear 29 in the counterclockwise direction in FIG. 1. Upon the counterclockwise rotation of the loading gear 29, the loading disk 4 is driven in the clockwise direction in FIG. 1. Thus, since the bracket 6 is driven through the joint 5 by the loading disk 4 as shown in FIG. 2, the leading guide pin 8 draws the video tape 2 out of the tape supply reel 1a so as to wind the video tape 2 around the guide cylinder 3. At this time, the bracket 6 is guided along a predetermined path by the bracket guide 7. When the bracket 6 has come close to an end of the predetermined path, a distal end of the stopper pin 11 is brought into contact with a dead-end side face of the slot 12a of the first fixed block 12 as shown in FIG. 5a, with the stopper pin 11 being not parallel to the dead-end side face of the slot 12a. Upon further drive of the loading disk 4, the stopper pin 11 is brought into pressing contact with the dead-end side face of the slot 12a so as to be parallel to the dead-end side face of the slot 12a as shown in FIG. 5b. There exists a change between angles of inclination of the bracket 6 with respect to the first fixed block 12 prior to and at the time of pressing contact therebetween. Prior to pressing contact of the bracket 6 with the dead-end side face of the slot 12a, the projection 6a of the bracket 6 is loosely fitted, with a play, into the guide groove 7a of the bracket guide 7 and therefore, is displaceable within the play of guide groove 7a.

Meanwhile, upon the counterclockwise rotation of the loading gear 29, the second slide member 27 is slid together with the first slide member 25 obliquely upwardly and rightward in FIG. 1 through engagement of the gear portion 27b with the reduction gear 30 in mesh with the loading gear 29, so that the tape take-off pin 26 mounted on the first slide member 25 takes off the video tape 2 obliquely upwardly and rightward in FIG. 1 as shown in FIG. 2. At this time, since the first and second slide members 25 and 27 are guided by the guide members 31 and 32 and, at the same time, the lever 24 for the pinch roller 21 is guided by the guide 32a of the guide member 32, such a phenomenon does not take place during sliding movement of the first and second slide members 25 and 27 that the lever 24 and the pinch roller 21 are brought into contact with the boundary portion of the recess 1c of the tape cassette 1. After the pinch roller 21 has been released from the recess 1c of the tape cassette 1 during loading of the video tape 2, the lever 24 is moved away from the guide 32a so as to be brought into engagement with a base portion of the tape take-off pin 26, so that the lever 24 is prevented from being pivoted about the rod 23 and thus, the pinch roller 21 confronts the capstan 22 so as to be spaced a predetermined distance from the capstan 22 at the time of completion of loading of the video tape 2.

Subsequently, the first slide member 25 is inserted into the slot 33a of the second fixed block 33 and is stopped thereat through contact of a distal end of the first slide member 25 with a dead-end wall of the slot 33a. Furthermore, upon drive of the loading gear 29, the second slide member 27 is also inserted into the slot 33a. Since the second fixed block 33 is formed, at the slot 33a, with an inclined bottom face 33b, a distal end of the second slide member 27 is guided by the inclined bottom face 33b so as to be further inserted into the slot 33a. Therefore, as shown in FIG. 6a, the distal end of the second slide member 27 depresses a lower face of the first slide member 25 upwardly so as to bring the first slide member 25 into pressing contact with a top face of the slot 33a. At the same time, since the distal end of the first slide member 25 is urged by the spring 28 into pressing contact with the dead-end wall of the slot 33a, the first slide member 25 is accurately positioned by the second fixed block 33.

Figure 8A:
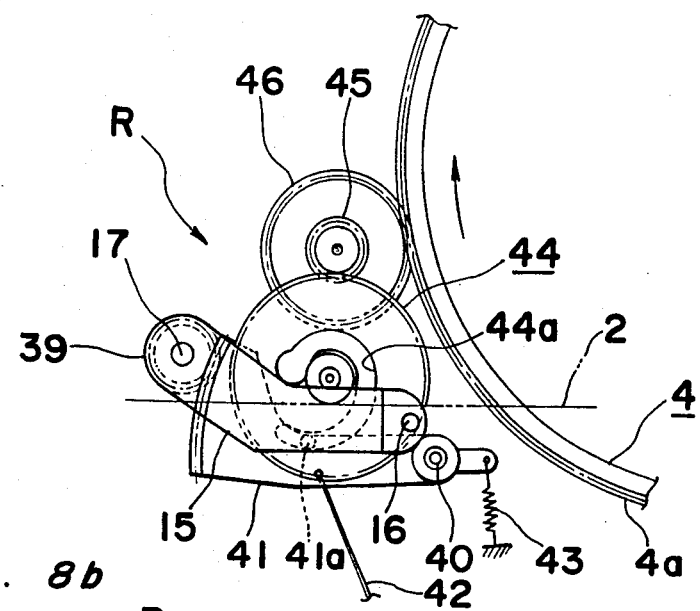
FIGS. 8a and 8b are top plan views of an ejector mechanism for ejecting a back tension lever, employed in the tape loading mechanism of FIG. 1, showing its unactuated and actuated state, respectively.
Figure 8B:
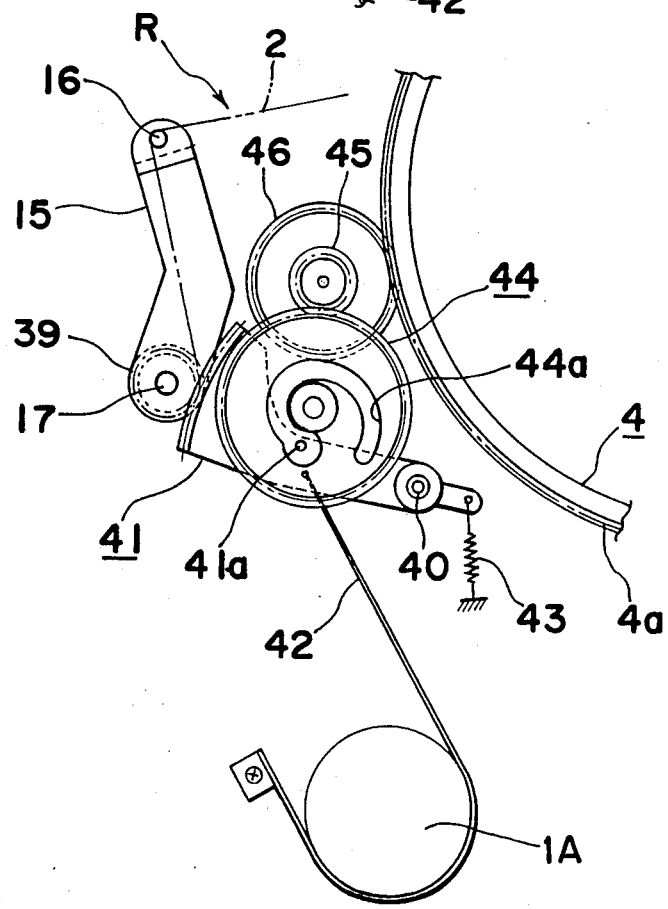

Meanwhile, the back tension lever 15 is ejected from the position shown in FIG. 1 to the position shown in FIG. 2 by the ejector mechanism R (FIG. 8). Namely, as shown in FIG. 8a, in response to the clockwise rotation of the loading disk 4, the second gear 44 is rotated in the clockwise direction view the third and fourth gears 45 and 46. Since a radius of the cam groove 44a gradually decreases, the sector wheel 41 is pivoted about the rod 40 in the clockwise direction, so that the first gear 39 in mesh with the sector wheel 41 is rotated in the counterclockwise direction and thus, the back tension lever 15 is pivoted in the counterclockwise direction about the rod 17 having the first gear 39 mounted thereon, whereby the pin 16 draws the video tape 2 out of the tape supply reel 1a. Thereafter, when loading of the video tape 2 has been completed as shown in FIG. 8b, the pin 41a of the sector wheel 41 is disposed at the stroke end of the cam groove 44a. Since the stroke end of the cam groove 44a is formed larger in width than other portions of the cam groove 44a as described earlier, the pin 41a is displaceable through a predetermined distance at the stroke end of the cam groove 44a, namely the back tension lever 15 is displaceable within a range corresponding to the predetermined displaceable distance of the pin 41a.

Figure 7:
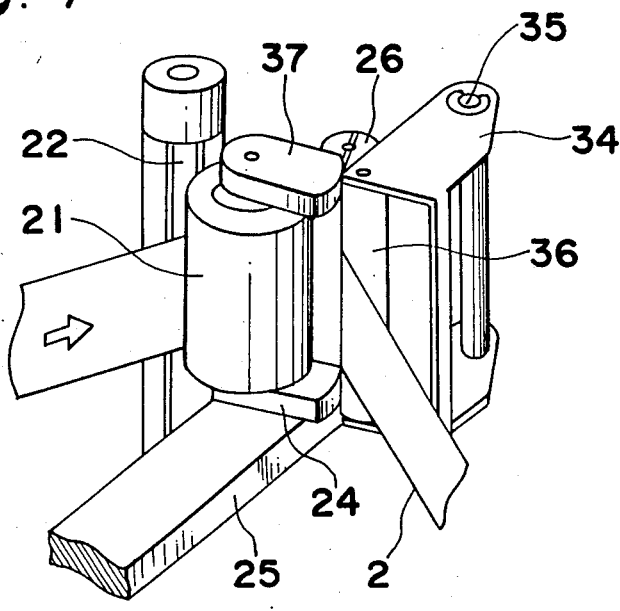
FIG. 7 is a perspective view of a pinch roller pressing mechanism employed in the second loading mechanism of FIG. 6.

When loading of the video tape 2 has been completed as described above, the video tape 2 is wound around the guide cylinder 3 through about 210° and the 8-mm VTR is set to a "stop" mode. When the "play" operation of the 8-mm VTR is performed in the "stop" mode, a solenoid (not shown) for bringing the pinch roller 21 into pressing contact with the capstan 22 is energized, so that the lever 34 for the pinch roller 21 is pivoted in the clockwise direction as shown in FIGS. 2 and 7. Consequently, the guide 36 depresses, at its upper and lower end portions, the flange 37 and the lever 24, respectively so as to bring the pinch roller 21 into pressing contact with the capstan 22.

Meanwhile, it is to be noted that although there exists a small change between positions of the guide 36 at the time of the pinch roller 21 being in and out of pressing contact with the capstan 22, it is so arranged that the video tape 2 does not come into contact with the tape inlet of the tape cassette 1 at all times.

As is clear from the foregoing description, in the tape loading mechanism of the present invention, since the tape loop is extended outwardly of the guide cylinder by the tape take-off pins which are disposed in the recess of the tape cassette at the time of unloading of the video tape, distances between adjacent ones of a plurality of the tape guides for winding the video tape around the guide cylinder can be reduced at the time of completion of loading of the video tape, so that all the tape guides can be positioned in the recess of the tape cassette at the time of unloading of the video tape.

Accordingly, in accordance with the present invention, since the erectable tape guides are not required to be provided, the tape loading mechanism has been simplified in structure.

Furthermore, in accordance with the present invention, since the tape take-off pin 26 and the pinch roller 21, which are provided on the first slide member 25, are securely positioned at the tape loading completion position through engagement of the first and second slide members 25 and 27 with the slot 33a of the second fixed block 33, the video tape 2 can be fed highly accurately in the VTR.

Moreover, in accordance with the present invention, since the leading guide pin 8 is highly accurately positioned at the tape loading completion position, the video tape 2 between the winding angle setting pins 19 and 20 is not subjected to an irregular force or is not kinked, thereby enabling highly accurate feeding of the video tape 2.

In addition, in accordance with the present invention, since the urging member 36 for urging the pinch roller 21 into pressing contact with the capstan 22 is formed into a cylindrical shape so as to function also as the tape guide, the number of the components and space required for the VTR are reduced, thus making the VTR compact in size.

Furthermore, in accordance with the present invention, since the pinch roller guide 32a for holding the pinch roller 21 out of contact with the tape cassette 1 during loading of the video tape 2 is provided, the pinch roller 21 does not come into contact with the tape cassette 1 during loading of the video tape 2 and confronts the capstan 22 at the tape loading completion position with a predetermined clearance being formed between the pinch roller 21 and the capstan 22.

Moreover, in accordance with the present invention, the ejector mechanism R for ejecting the back tension lever 15 has been simplified in structure and pivotal movement of the back tension lever 15 is regulated at the tape loading completion position by the ejector mechanism R, thereby making the VTR compact in size.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a tape loading mechanism for helically winding a tape around a guide cylinder by drawing said tape out of a tape cassette, the improvement comprising:
   a pin for drawing said tape from said tape cassette and for detecting tension of said tape;
   a tape loading means for winding said tape around said guide cylinder over a predetermined winding angle;
   said pin for drawing said tape and said tape loading means being inserted into said tape cassette for drawing said tape from said cassette;
   a cam driven in response to displacement of said tape loading means and formed with a cam groove;
   a shaft; and
   a back tension lever pivoted about said shaft and supporting said tape drawing pin;
   the pivotal movement of said back tension lever about said shaft being controlled by said cam groove so that said tape drawing pin draws said tape from said tape cassette in response to the displacement of said tape loading means;
   said cam groove being formed, at a position thereof corresponding to the completion of the drawing of said tape by said tape drawing pin, larger in width than other portions of said cam groove so as to allow said tape drawing pin to be pivoted at said tape loading completion position such that said tape drawing pin is capable of detecting the tension of said tape.

2. A tape loading mechanism as claimed in claim 1, wherein said loading means includes a first loading means and a second loading means,
   said first loading means having a loading disk rotatably around said guide cylinder and a first positioning means for positioning said loading disk,
   said second loading means having a pinch roller, a slide member having said pinch roller placed thereon, and a second positioning means for positioning said slide member.

3. A tape loading mechanism as claimed in claim 2, wherein said first positioning means includes a stopper pin coupled with said loading disk and a first fixed block formed with a first slot engageable with said stopper pin such that said loading disk is positioned by engagement of said stopper pin with said slot.

4. A tape loading mechanism as claimed in claim 2, wherein said second positioning means includes a second fixed block formed with a second slot engageable with said slide member such that said slide member is positioned by engagement of said slide member with said second slot.

5. A tape loading mechanism as claimed in claim 3, wherein said second positioning means includes a second fixed block formed with a second slot engageable with said slide member such that said slide member is positioned by engagement of said slide member with said second slot.

6. A tape loading mechanism as claimed in claim 2, wherein said second loading means further comprises:
a guide means for guiding said slide member, said guide means having a guide portion for preventing said pinch roller from coming into contact with said tape cassette.

7. A tape loading mechanism as claimed in claim 5, wherein said second loading means further comprises:
a guide means for guiding said slide member, said guide means having a guide portion for preventing said pinch roller from coming into contact with said tape cassette.

8. A tape loading mechanism as claimed in claim 2, wherein said second loading means further comprises:
a capstan; and
an urging means for urging said pinch roller into pressing contact with said capstan, said urging means including a tape guide cylindrical member.

9. A tape loading mechanism as claimed in claim 6, wherein said second loading means further comprises:
a capstan; and
an urging means for urging said pinch roller into pressing contact with said capstan, said urging means including a cylindrical tape guide member.

10. A tape loading mechanism as claimed in claim 7, wherein said second loading means further comprises:
a capstan; and
an urging means for urging said pinch roller into pressing contact with said capstan, said urging means including a cylindrical tape guide member.

11. In a tape loading mechanism for helically winding a tape around a guide cylinder by drawing said tape out of a tape cassette, the improvement comprising:
a pin for drawing said tape from out of said tape cassette;
a tape loading means having a loading disk rotatably around said guide cylinder, a leading guide pin, a trailing guide pin and a bracket associated operatively with said loading disk and having said leading and trailing guide pins fixed thereto;
said leading and trailing guide pins being disposed along said loading disk, being displaced along said loading disk and, having a constant distance therebetween, said leading guide pin being disposed forwardly of said trailing guide pin at the time of loading of said tape;
said tape drawing pin and said tape loading means being inserted into said tape cassette for drawing said tape from said cassette;
said tape being wound around said guide cylinder over a predetermined winding angle in response to rotation of said loading disk in a predetermined direction to set a tape loading state in which said trailing guide pin substantially confronts said tape cassette so that said guide cylinder is interposed between said trailing guide pin and said tape cassette;
a shaft; and
a lever pivoted about said shaft from an unloading position to a loading position in response to the rotation of said loading disk, said tape drawing pin being mounted on said lever;
said tape being prevented by said tape drawing pin, in a portion of a tape travel path, from coming into contact with said guide cylinder, which portion of said tape travel path extends from a tape supply reel of said tape cassette to said trailing guide pin.

12. A tape loading mechanism as claimed in claim 11, further comprising;
first and second fixed pins at the opposite sides of said tape drawing pin when said lever is disposed at said loading position;
said tape drawing pin further detecting tension of said tape;
said tape loading means having an intermediate guide pin fixed, between said leading and trailing guide pins, to said bracket so that distances between adjacent ones of said leading, intermediate and trailing guide pins are kept constant.

13. A tape loading mechanism as claimed in claim 12, further comprising:
a cam driven in response to rotation of said loading disk and formed with a cam groove; and
a pin member engageable with said cam groove and operatively associated with said lever;
said cam groove having, at a portion thereof corresponding to said loading position of said lever, a larger width than other portions of said cam groove so as to allow said pin member to be moved through a predetermined distance in said larger portion of said cam groove so that said tape drawing pin is pivoted when said lever is disposed at said loading position.

14. A tape loading mechanism as claimed in claim 12, further comprising:
a pinch roller and a capstan; and
urging means for urging said pinch roller into pressing contact with said capstan, said urging means including a cylindrical tape guide member.

15. A tape loading mechanism as claimed in claim 13, further comprising:
a pinch roller and
a capstan; and
urging means for urging said pinch roller into pressing contact with said capstan, said urging means including a cylindrical tape guide member.

* * * * *